United States Patent
Horibe et al.

(10) Patent No.: US 11,014,159 B2
(45) Date of Patent: May 25, 2021

(54) COMPOSITE MACHINING MACHINE AND COMPOSITE MACHINING METHOD

(71) Applicant: Yamazaki Mazak Corporation, Niwa-gun (JP)

(72) Inventors: Kazuya Horibe, Niwa-gun (JP); Kazuki Uemura, Niwa-gun (JP); Seiichi Yoshida, Niwa-gun (JP)

(73) Assignee: YAMAZAKI MAZAK CORPORATION, Aichi (JP)

( * ) Notice: Subject to any disclaimer, the term of this patent is extended or adjusted under 35 U.S.C. 154(b) by 230 days.

(21) Appl. No.: 16/034,364

(22) Filed: Jul. 13, 2018

(65) Prior Publication Data

US 2018/0318934 A1 Nov. 8, 2018

Related U.S. Application Data

(63) Continuation of application No. PCT/JP2016/073999, filed on Aug. 17, 2016.

(51) Int. Cl.
*B33Y 30/00* (2015.01)
*B22F 3/24* (2006.01)
(Continued)

(52) U.S. Cl.
CPC ............... *B22F 3/24* (2013.01); *B22F 3/115* (2013.01); *B22F 10/20* (2021.01); *B23P 23/04* (2013.01);
(Continued)

(58) Field of Classification Search
None
See application file for complete search history.

(56) References Cited

U.S. PATENT DOCUMENTS 10,220,469 B2 * 3/2019 Yamashita ......... B23Q 3/15766
2005/0076757 A1 4/2005 Kikuchi et al.
(Continued)

FOREIGN PATENT DOCUMENTS

CN 104493491 4/2015
CN 204584273 U 8/2015
(Continued)

OTHER PUBLICATIONS

English translation of CN205238589 (Year: 2016).*
(Continued)

*Primary Examiner* — Jacob T Minskey
*Assistant Examiner* — Baileigh Kate Darnell
(74) *Attorney, Agent, or Firm* — Mori & Ward, LLP (57) ABSTRACT

A composite machining machine includes a first machining head, a second machining head, a workpiece holder, a cover, and a frame. The first machining head is movable in a first region to perform additive manufacturing on the workpiece in a second region. The second machining head is movable in the second region to perform cutting on the workpiece. The workpiece holder holds the workpiece in the second region. The cover covers the first region. The frame includes two columns and a beam member coupling the columns. The cover includes a region definition member openable at least partially. The region definition member defines the second region. The first machining head is movable in a guided manner in a range between the columns. The beam member is disposed so that the predetermined range lies inside the first region, and outside and above the second region.

13 Claims, 5 Drawing Sheets

(51) Int. Cl.
*B22F 12/00* (2021.01)
*B23P 23/04* (2006.01)
*B23Q 1/56* (2006.01)
*B23Q 11/08* (2006.01)
*B33Y 10/00* (2015.01)
*B23Q 1/58* (2006.01)
*B23Q 11/00* (2006.01)
*B22F 10/20* (2021.01)
*B33Y 50/02* (2015.01)
*B22F 3/115* (2006.01)
*B22F 10/30* (2021.01)

(52) U.S. Cl.
CPC ............. *B23Q 1/56* (2013.01); *B23Q 1/58* (2013.01); *B23Q 11/00* (2013.01); *B23Q 11/08* (2013.01); *B33Y 10/00* (2014.12); *B33Y 30/00* (2014.12); *B33Y 50/02* (2014.12); *B22F 10/30* (2021.01); *B22F 2003/247* (2013.01); *B22F 2998/10* (2013.01); *Y02P 10/25* (2015.11)

(56) References Cited

U.S. PATENT DOCUMENTS

| | | | |
|---|---|---|---|
| 2011/0285060 A1* | 11/2011 | Yamamoto | B29C 64/153 264/401 |
| 2015/0000108 A1 | 1/2015 | Hascoet et al. | |
| 2015/0056464 A1 | 2/2015 | Brice | |
| 2015/0290741 A1 | 10/2015 | Abe et al. | |
| 2016/0144429 A1 | 5/2016 | Mizutani | |
| 2016/0221118 A1 | 8/2016 | Yamashita et al. | |
| 2016/0263706 A1* | 9/2016 | Potocki | B23K 26/361 |
| 2017/0136545 A1* | 5/2017 | Yoshimura | B33Y 40/00 |
| 2018/0141174 A1* | 5/2018 | Mori | B33Y 40/00 |

FOREIGN PATENT DOCUMENTS

| | | |
|---|---|---|
| CN | 204639130 U | 9/2015 |
| CN | 105473272 | 4/2016 |
| CN | 105817625 | 8/2016 |
| JP | 2005-125482 | 5/2005 |
| JP | 2015-511180 | 4/2015 |
| JP | 5937249 B1 | 6/2016 |
| JP | 5940712 B1 | 6/2016 |
| JP | 2018-27612 | 2/2018 |
| WO | WO 2015/189600 | 12/2012 |
| WO | WO 2015/005497 | 1/2015 |

OTHER PUBLICATIONS

Extended European Search Report for corresponding EP Application No. 16913501.9-1103, dated Oct. 29, 2018.
International Search Report for corresponding International Application No. PCT/JP2016/073999, dated Nov. 8, 2016.
Written Opinion for corresponding International Application No. PCT/JP2016/073999, dated Nov. 8, 2016.
Japanese Office Action for corresponding JP Application No. 2016-570898, dated Apr. 4, 2017 (w/ English machine translation).
Japanese Office Action for corresponding JP Application No. 2016-570898, dated Aug. 22, 2017 (w/ English machine translation).
Japanese Office Action for corresponding JP Application No. 2017-100494, dated Aug. 31, 2017 (w/ English machine translation).
Japanese Office Action for corresponding JP Application No. 2017-100494, dated Feb. 28, 2018 (w/ English machine translation).
Chinese Office Action for corresponding CN Application No. 201680073395.5, dated Jan. 14, 2019.

\* cited by examiner

COMPOSITE MACHINING MACHINE AND COMPOSITE MACHINING METHOD

CROSS-REFERENCE TO RELATED APPLICATIONS

The present application is a continuation application of International Application No. PCT/JP2016/073999, filed Aug. 17, 2016. The contents of this application are incorporated herein by reference in their entirety.

BACKGROUND OF THE INVENTION

Field of the Invention

The present invention relates to a composite machining machine and a composite machining method.

Discussion of the Background

Conventionally, such a composite machining technique is known that three-dimensional additive fabrication (hereinafter referred to as "additive manufacturing") is performed on a metallic workpiece through welding, for example, and then the object fabricated through the additive manufacturing is then finished through cutting, for example.

Even these kinds of composite machining can be achieved by sequentially performing respective machining using special-purpose machines. However, such a composite machining machine is known that supply means for laser machining and fabrication means for cutting are mounted on a single machining head in order to reduce a workspace by integrating such special-purpose machines that respectively perform various kinds of machining into one, as well as in order to save working hours including arrangements by performing the various kinds of machining with the single machine (for example, see Japanese Translation of PCT International Application Publication No. JP-T-2015-511180).

Such a machining machine is also known that includes, in order to shorten machining hours for performing additive machining and removal machining for improved productivity, a tool holder that holds a tool used to perform removal machining on a workpiece, an additive machining head that discharges a material to perform additive machining on the workpiece, a workpiece holder that holds the workpiece when the workpiece is conveyed into or from a machining area, and a robot arm to which the additive machining head and the workpiece holder can be attached (for example, see Japanese Patent No. 5937249).

The contents of Japanese Translation of PCT International Application Publication No. JP-T-2015-511180 and Japanese Patent No. 5937249 are incorporated herein by reference in their entirety.

SUMMARY OF THE INVENTION

According to one aspect of the present invention, a composite machining machine is configured to perform additive manufacturing and cutting on a workpiece. The composite machining machine includes a first machining head, a second machining head, a workpiece holder, a cover, and a frame of a portal structure. The first machining head is movable relative to the workpiece in a first region to perform additive manufacturing on the workpiece in a second region included in the first region. The second machining head is movable relative to the workpiece in the second region to perform cutting on the workpiece. The workpiece holder is configured to hold the workpiece in the second region. The cover covers the first region. The frame includes two columns and a beam member coupling the two columns. The cover includes a region definition member that is openable at least partially. The region definition member is disposed at a position defining the second region in the first region. The first machining head is attached so as to move in a guided manner in a predetermined range between the two columns in the beam member. The beam member is disposed so that the predetermined range lies inside the first region, and outside and above the second region.

According to another aspect of the present invention, a composite machining method is achieved by using a composite machining machine. The composite machining machine includes a first machining head, a second machining head, a workpiece holder, a cover, a frame of a portal structure, and a region definition member. The first machining head is movable relative to a workpiece in a first region to perform additive manufacturing on the workpiece. The second machining head is movable relative to the workpiece in a second region included in the first region to perform cutting on the workpiece. The workpiece holder is configured to hold the workpiece in the second region. The cover covers the first region. The frame includes two columns and a beam member coupling the two columns. The region definition member is at least partially openable and is disposed at a position defining the second region inside the cover. The composite machining method includes performing additive manufacturing on the workpiece, and performing cutting on the workpiece. The first machining head is attached so as to move in a guided manner in a predetermined range between the two columns in the beam member. The beam member is disposed so that the predetermined range lies in the first region, and outside and above the second region. The additive manufacturing is performed with the region definition member open. The cutting is performed with the region definition member closed.

According to a further aspect of the present invention, a composite machining machine includes a workpiece holder, a guide rail, a first machining head, a second machining head, a cover, and a partition. The workpiece holder is to hold a workpiece. The first machining head is supported on the guide rail to be movable along the guide rail. The first machining head is configured to perform additive manufacturing on the workpiece. The second machining head is movable relatively to the workpiece to perform cutting on the workpiece. The cover is to cover the workpiece holder, the guide rail, the first machining head, and the second machining head. The partition is provided in the cover to take alternatively a first position or a second position. The first machining head is movable to the workpiece along the guide rail to perform additive manufacturing on the workpiece if the partition is in the first position. The partition is configured to isolate the guide rail from the second machining head so that the second machining head performs cutting on the workpiece if the partition is in the second position.

According to a further aspect of the present invention, a composite machining method includes holding a workpiece in a state where a cover covers the workpiece, a first machining head, a second machining head, and a guide rail supporting the first machining head. The composite machining method includes moving a partition provided in the cover to a first position such that the first machining head is movable to the workpiece along the guide rail. The composite machining method includes controlling the first machining head to move to the workpiece along the guide rail to perform additive manufacturing on the workpiece.

The composite machining method includes moving the partition to a second position such that the partition isolates the guide rail from the workpiece. The composite machining method includes controlling the second machining head to move relatively to the workpiece to perform cutting on the workpiece while the partition is in the second position.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE EMBODIMENTS

A composite machining machine according to an example of the present invention will now be schematically described herein with reference to FIGS. 1, 2, 3A, 3B, and 3C.

Figure 1:
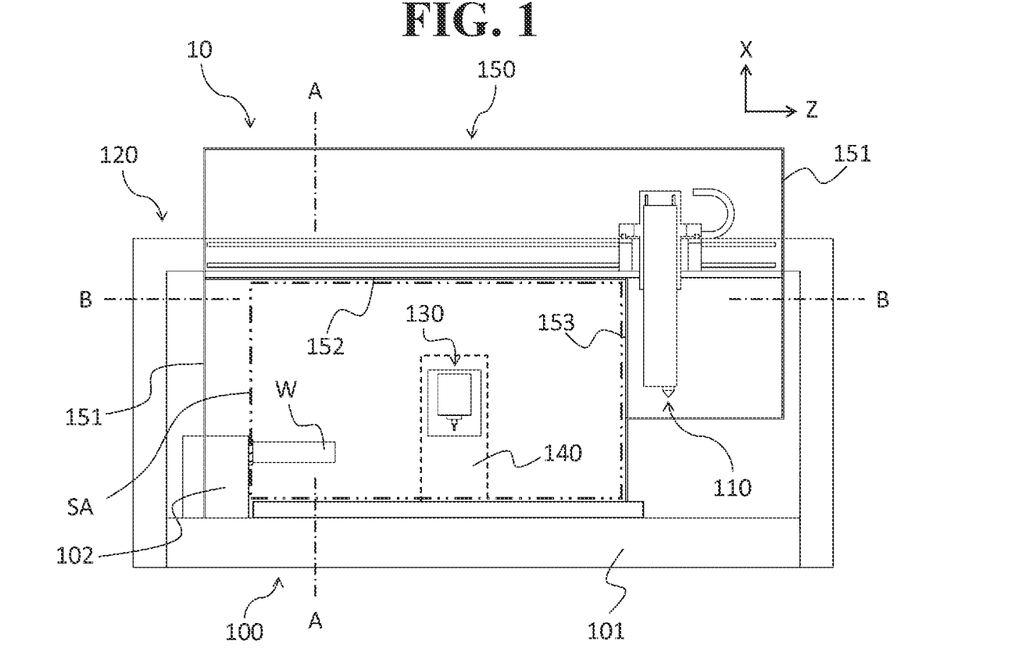
FIG. 1 is a partial cross-sectional view of a composite machining machine according to an example of the present invention, the partial cross-sectional view schematically illustrating the composite machining machine.

FIG. 1 is a partial cross-sectional view of the composite machining machine according to the example of the present invention, the partial cross-sectional view schematically illustrating the composite machining machine. The partial cross-sectional view described below shows, unless otherwise specified, an internal structure when a longitudinal section of a cover attached to the composite machining machine is viewed from front.

As illustrated in FIG. 1, a composite machining machine 10 according to the example of the present invention includes a body 100, a holding mechanism 102, an additive manufacturing mechanism 110, a first transfer mechanism 120, a cutting mechanism 130, a second transfer mechanism 140, a cover 150, and a control mechanism (not shown). The holding mechanism 102 is disposed on the body 100 to hold a workpiece W. The additive manufacturing mechanism 110 performs additive manufacturing on the workpiece W. The first transfer mechanism 120 causes the additive manufacturing mechanism 110 to move relative to the workpiece W. The cutting mechanism 130 performs cutting on the workpiece W. The second transfer mechanism 140 causes the cutting mechanism 130 to move relative to the workpiece W. The control mechanism controls how the composite machining machine 10 operates.

The body 100 includes a base 101, and the holding mechanism 102. In addition, the base 101 is disposed with the second transfer mechanism 140, described above.

In this embodiment, an internal area covered by the cover 150 is referred to as "first region (FA)," while an area partitioned by a region definition member (a partition), described later, in the first region is referred to as "second region (SA)."

The cover 150 includes a main cover 151, a first region definition member 152, and a second region definition member 153. The first region definition member 152 and the second region definition member 153 are respectively openably attached adjacent to boundaries on a top face and a side face of the second region SA, described above.

Figure 2:
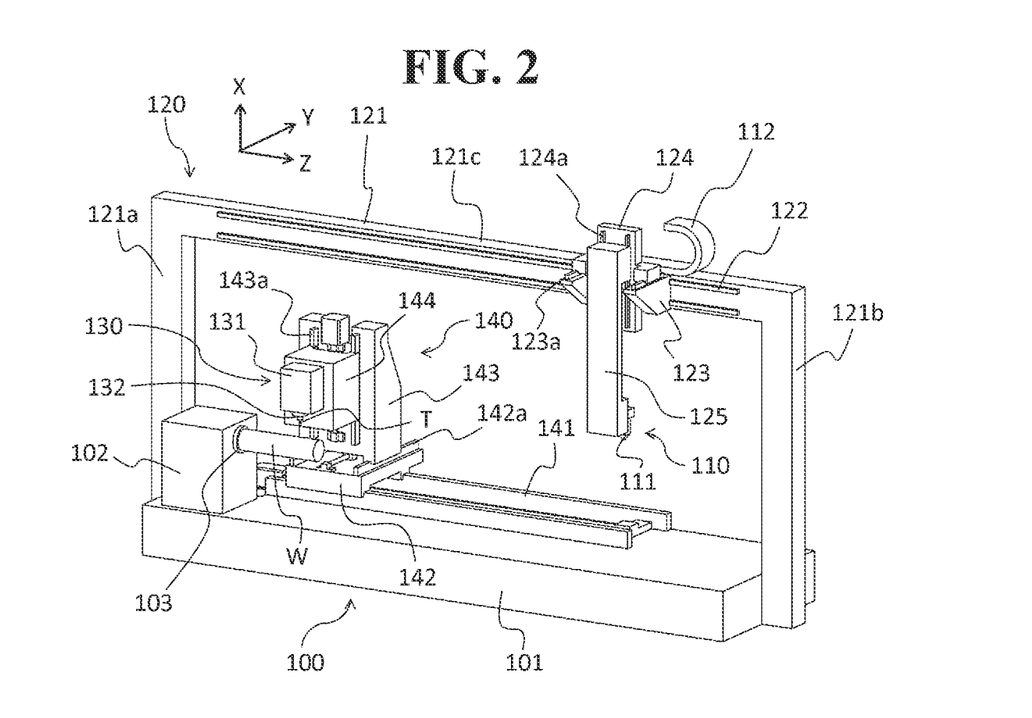
FIG. 2 is a perspective view of an additive manufacturing mechanism and a cutting mechanism in the composite machining machine according to the example of the present invention, the perspective view illustrating how the additive manufacturing mechanism and the cutting mechanism are arranged.

FIG. 2 is a perspective view of an additive manufacturing mechanism and a cutting mechanism in the composite machining machine according to the example of the present invention, the perspective view illustrating how the additive manufacturing mechanism and the cutting mechanism are arranged.

As illustrated in FIG. 2, in the composite machining machine 10 according to the example of the present invention, the holding mechanism 102 and the second transfer mechanism 140 attached with the cutting mechanism 130 are disposed on the base 101 of the body 100.

On the other hand, the first transfer mechanism 120 attached with the additive manufacturing mechanism 110 is disposed in an aspect so as to straddle over the base 101, described above.

The body 100 includes the base 101, and the holding mechanism 102 that holds a workpiece W.

In the example of the present invention, the holding mechanism 102 has, on its side face, a workpiece holder 103, such as a chuck mechanism. The workpiece holder 103 is configured to rotatably hold the workpiece.

The additive manufacturing mechanism 110 includes a first machining head 111, a transmission mechanism 112, and the first transfer mechanism 120. The first machining head 111 is attached to an end of an X-axis arm 125 of the first transfer mechanism 120, described later. The transmission mechanism 112 is coupled to the first machining head 111. The first transfer mechanism 120 causes the first machining head 111 to move relative to the workpiece W.

The term "additive manufacturing" referred in this embodiment means a technique of controlling a position from which heat is generated by allowing an energy beam, such as a beam, to concentrate while an additive material is supplied to a workpiece to selectively melt and join the above-described additive material onto the workpiece.

The first machining head 111 includes a supply unit and an irradiation unit. The supply unit supplies an additive material, such as metal wire and metal powder, to the workpiece W. The irradiation unit irradiates an energy beam, such as a laser beam and an electronic beam, onto the workpiece W supplied with the above-described additive material.

In addition, the transmission mechanism 112 includes a transmission path through which the above-described additive material, an energy beam, and a gas used for additive manufacturing transmit, for example, and is attached along a frame 121 of the first transfer mechanism 120, described later.

The first transfer mechanism 120 includes the frame 121, a Z-axis arm 123, a Y-axis arm 124, and the X-axis arm 125. The frame 121 includes two columns 121a and 121b and a beam member 121c coupling the two columns 121a and 121b along axis Z. The Z-axis arm 123 moves along a side face of the beam member 121c. The Y-axis arm 124 is attached to the Z-axis arm 123, and moves along axis Y. The X-axis arm 125 is attached to the Y-axis anti 124, and moves along axis X.

As illustrated in FIG. 1, the beam member 121c is disposed outside and above the second region SA, described above. In other words, the first region definition member 152 is disposed between the beam member 121c of the frame 121 and the second machining head 131, adjacent to the beam member 121c, and along the beam member 121c.

The beam member 121c includes, on its side face, guide rails 122 that guide the Z-axis arm 123. Similarly, the Z-axis arm 123 and the Y-axis arm 124 respectively include guide rails 123a and 124a that respectively guide the Y-axis arm 124 and the X-axis arm 125.

The first machining head 111 of the additive manufacturing mechanism 110 is attached to a side face of the end of the X-axis arm 125, and is configured to be movable in a desired direction as the Z-axis arm 123, the Y-axis arm 124, and the X-axis arm 125, described above, respectively move in Z-axis, Y-axis, and X-axis directions.

As illustrated in FIG. 1, the guide rails 122 of the beam member 121c are defined in a range inside the main cover 151, and the first machining head 111 accordingly moves inside the main cover 151 in the Z-axis direction.

When the first machining head 111 is attached to the X-axis arm 125, the first machining head 111 may be configured to rotate about an axis parallel to axis Y, and to be tiltable at a predetermined angle on an XZ plane.

In addition, between the first machining head 111 and the transmission mechanism 112, a transmission path (not shown) is disposed in the X-axis arm 125 or on the side face of the X-axis arm 125, and is configured so that an additive material, an energy beam, and a gas used for additive manufacturing can transmit, for example.

The transmission path, described above, and wiring in an electric system, for example, can therefore be collectively handled for easy routing and maintenance.

The cutting mechanism 130 includes a second machining head 131 and the second transfer mechanism 140. The second machining head 131 is attached to a side face of an X-axis slider 144 of the second transfer mechanism 140, described later. The second transfer mechanism 140 causes the second machining head 131 to move relative to the workpiece W.

The term "cutting" referred in this specification includes "turning" through which a workpiece attached to a workpiece holder is rotated and allowed to come into contact with a turning tool attached to a machining head for machining, and "milling" through which a workpiece attached to a workpiece holder and fixed or tilted at an angle indexed is allowed to come into contact with a milling tool attached to a machining head and rotated, for example.

The second machining head 131 includes, on its lower end, a tool attachment 132 used to attach a cutting tool T, as well as internally has a rotation transmission mechanism (not shown), such as a motor and a spindle, configured to rotate the cutting tool by allowing the tool attachment 132, described above, to rotate. To perform milling, this rotation transmission mechanism rotates a milling cutting tool T attached to the tool attachment 132, described above.

The second transfer mechanism 140 includes guide rails 141, a Z-axis slider 142, a Y-axis slider 143, and the X-axis slider 144. The guide rails 141 are attached along axis Z on the base 101 of the body 100. The Z-axis slider 142 moves on the guide rails 141. The Y-axis slider 143 is attached to the Z-axis slider 142, and moves along axis Y. The X-axis slider 144 is attached to the Y-axis slider, and moves along axis X.

The Z-axis slider 142 and the Y-axis slider 143 respectively include guide rails 142a and 143a that respectively guide the Y-axis slider 143 and the X-axis slider 144.

The second machining head 131 of the cutting mechanism 130 is attached to the side face of the X-axis slider 144, and is configured to be movable in a desired direction within the second region SA illustrated in FIG. 1, as the Z-axis slider 142, the Y-axis slider 143, and the X-axis slider 144, described above, respectively move in the Z-axis, Y-axis, and X-axis directions.

When the second machining head 131 is attached to the side face of the X-axis slider 144, the second machining head 131 may be configured to rotate about an axis parallel to axis Y, and to be tiltable at a predetermined angle on the XZ plane.

Figure 3A:
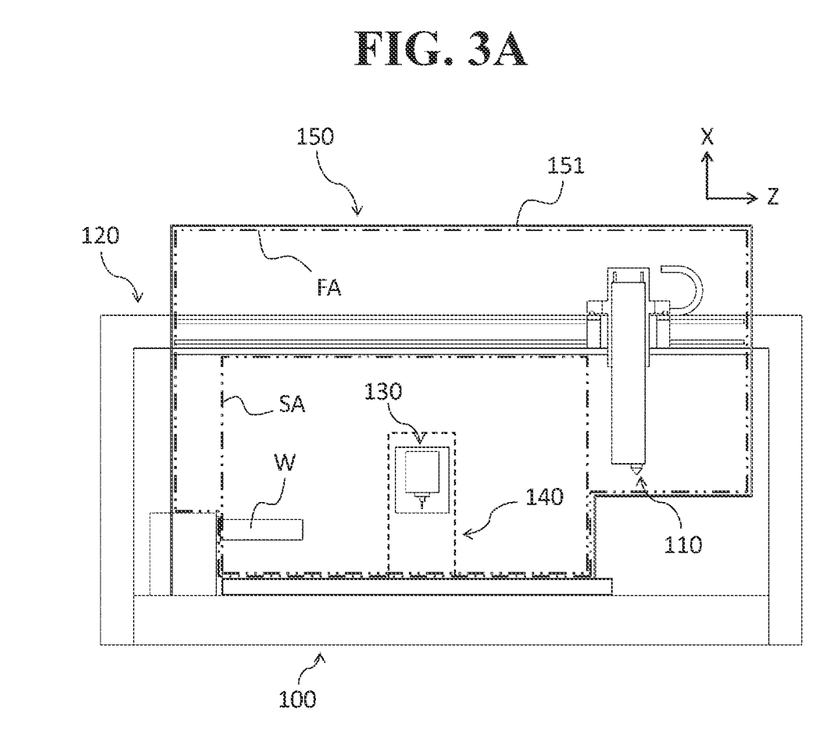
FIG. 3A is a schematic view of region definition members illustrated in FIG. 1, the schematic view illustrating drive operations of the region definition members, and is also a partial cross-sectional view when viewed from front with the region definition members open.
Figure 3B:
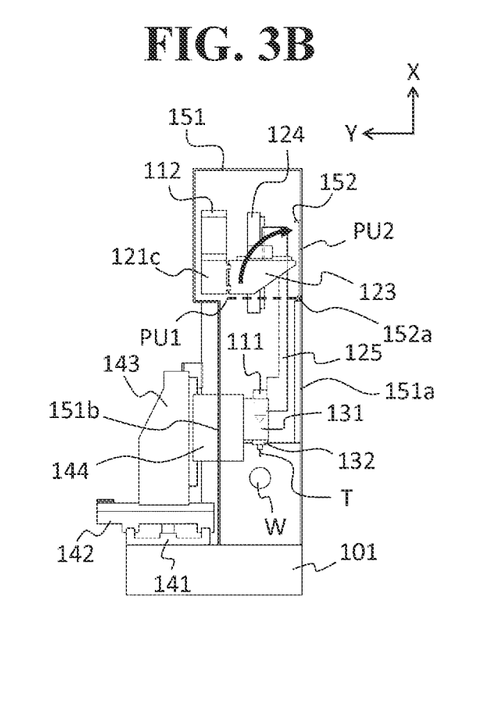
FIG. 3B is a schematic view of one of the region definition members illustrated in FIG. 1, the schematic view illustrating the drive operation of the one of the region definition members, and is a partial cross-sectional view taken along the line A-A of FIG. 1, when viewed from left with the one of the region definition members performing an open operation.
Figure 3C:
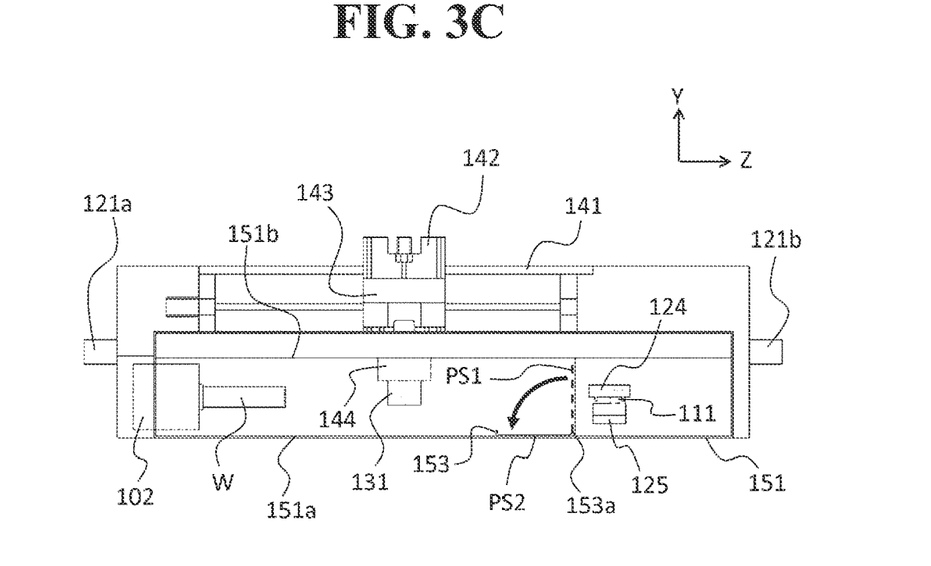
FIG. 3C is a schematic view of another one of the region definition members illustrated in FIG. 1, the schematic view illustrating the drive operation of the other one of the region definition members, and is also a partial cross-sectional view taken along the line B-B of FIG. 1, when viewed from top with the other one of the region definition members performing an open operation.

FIGS. 3A, 3B, and 3C are schematic views of the region definition members illustrated in FIG. 1, the schematic views illustrating drive operations of the region definition members, where FIG. 3A is a partial cross-sectional view when viewed from front with the region definition members open, FIG. 3B is a partial cross-sectional view taken along the line A-A of FIG. 1, when viewed from left with one of the region definition members performing an open operation, and FIG. 3C is a partial cross-sectional view taken along the line B-B of FIG. 1, when viewed from top with another one of the region definition members performing an open operation.

As illustrated in FIG. 3A, in the composite machining machine 10 according to the example of the present invention, when the first region definition member 152 and the second region definition member 153 are both open, the first region FA including the second region SA is defined inside the main cover 151 of the cover 150, and thus a region separated from outside the main cover 151 is defined.

The first region definition member 152 has, as illustrated in FIG. 3B, a width approximately identical to a gap between a front face 151*a* and a rear face 151*b*, which both lie in the second region SA inside the main cover 151 illustrated in FIG. 1, so as to straddle over the gap, and is turnably attached on the front face 151*a*, via a hinge 152*a*, at a position adjacent to a top end of the second region SA.

In addition, the first region definition member 152 is coupled to a drive mechanism (not shown, a link mechanism, for example) so that open/close operations will take place based on an instruction given by the control mechanism to turn between a closed position PU1 and an open position PU2.

The second region definition member 153 has, as illustrated in FIG. 3C, a width approximately identical to a gap between the front face 151*a* of the main cover 151 and the rear face 151*b* so as to straddle over the gap, and is turnably attached on the front face 151*a*, via a hinge 153*a*, at a position adjacent to a right end of the second region SA.

The second region definition member 153 is, similar to the first region definition member 152, coupled to a drive mechanism (not shown, a link mechanism, for example), so that open/close operations will take place based on an instruction given by the control mechanism to turn between a closed position PS1 and an open position PS2.

Next, a specific example of machining operation performed by the composite machining machine according to the example of the present invention will now be described herein with reference to FIGS. 4 and 5.

Figure 4:
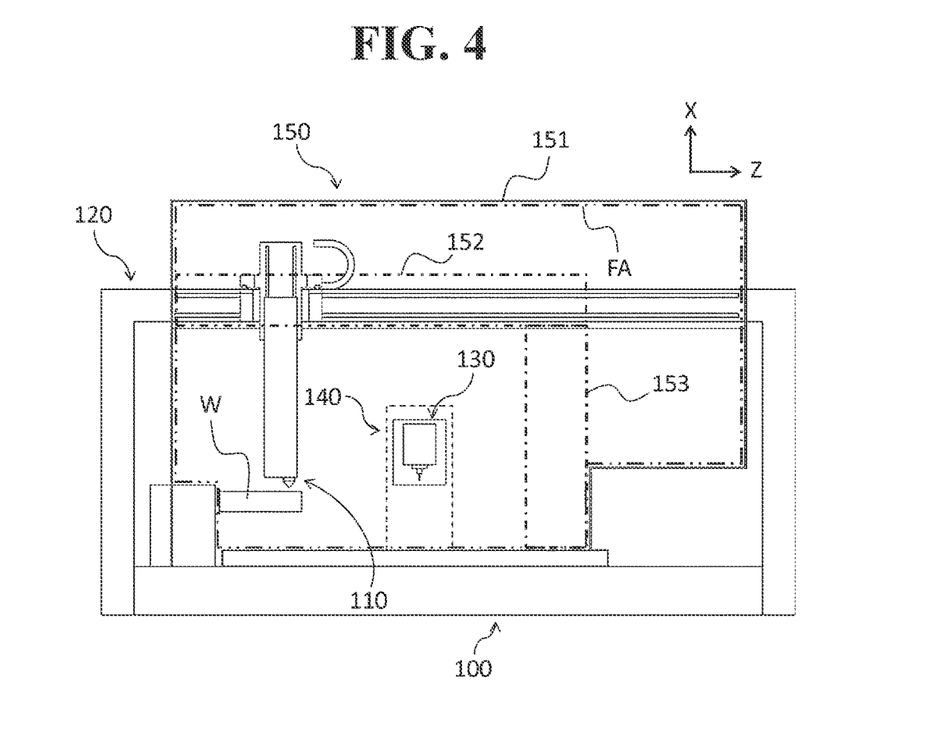
FIG. 4 is a partial cross-sectional view of the composite machining machine according to the example of the present invention, the partial cross-sectional view illustrating a state with an additive manufacturing step being performed.

FIG. 4 is a partial cross-sectional view of the composite machining machine according to the example of the present invention, the partial cross-sectional view illustrating a state with an additive manufacturing step being performed.

As illustrated in FIG. 4, in the additive manufacturing step, the first region definition member 152 and the second region definition member 153, which are attached to the cover 150 of the composite machining machine 10, respectively lie at the open position PU2 and PS2 illustrated in FIGS. 3A, 3C, and 3C, and are thus open.

The first region FA is accordingly defined inside the main cover 151, and an atmosphere inside the main cover 151 is separate from outside.

The first transfer mechanism 120 is then used to cause the additive manufacturing mechanism 110 to move adjacent to the workpiece W, and additive manufacturing is performed on the workpiece W. At this time, the first region FA inside the main cover 151 is separate from outside, and thus, even if an energy beam is reflected irregularly during the additive manufacturing step, such an accident that an operator being present outside the cover 150 is irradiated by the irregularly reflected energy beam would be less likely to occur.

On the other hand, the second transfer mechanism 140 causes the cutting mechanism 130 to move relative to the workpiece W to a position away in the Z-axis direction to become a stand-by state.

Figure 5:
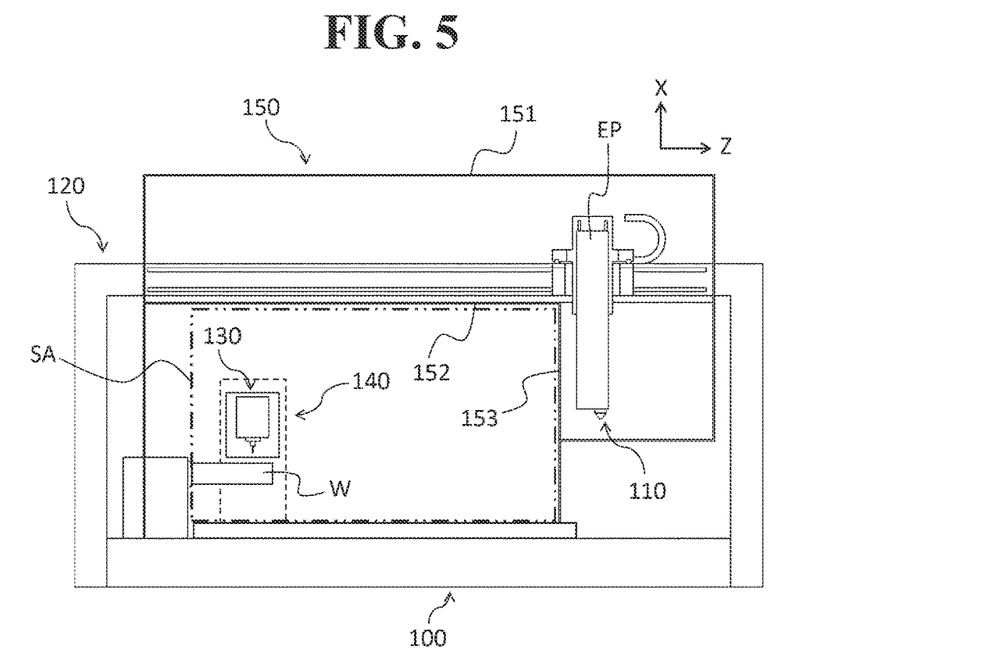
FIG. 5 is a partial cross-sectional view of the composite machining machine according to the example of the present invention, the partial cross-sectional view illustrating a state with a cutting step being performed.

FIG. 5 is a partial cross-sectional view of the composite machining machine according to the example of the present invention, the partial cross-sectional view illustrating a state with a cutting step being performed.

Upon completion of the additive manufacturing step, the first transfer mechanism 120 causes the additive manufacturing mechanism 110 to move in the Z-axis direction to a retraction position EP outside the second region SA.

After that, as illustrated in FIG. 5, in the cutting step, the first region definition member 152 and the second region definition member 153, which are attached to the cover 150 of the composite machining machine 10, respectively turn to the closed position PU1 and PS1 illustrated in FIGS. 3A, 3B, and 3C, and are thus closed.

The second region SA is accordingly defined inside the main cover 151, and an atmosphere inside the second region SA is separate from outside the second region SA.

The second transfer mechanism 140 is then used to cause the cutting mechanism 130 to move adjacent to the workpiece W, and cutting is performed on the workpiece W. At this time, as described above, the first transfer mechanism 120 causes the additive manufacturing mechanism 110 to move to the retraction position EP outside the second region SA to become a retraction state.

The second region SA is separate from outside by the first region definition member 152 and the second region definition member 153, and the cutting mechanism 130 thus performs machining while being separate by the region definition members from the additive manufacturing mechanism 110.

With the above-described configuration, the composite machining machine 10 according to the example of the present invention closes, during a cutting step, the first region definition member 152 and the second region definition member 153 to separate the second region SA from outside.

Even if chips, cutting oil, and coolant scatter during a cutting step, the first machining head 111 of the additive manufacturing mechanism 110, which has been retracted outside the second region, will neither be contaminated nor damaged.

In particular, not only the first machining head 111, but also the beam member 121*c* configuring the first transfer mechanism 120 are disposed outside the second region SA. This configuration can prevent, without requiring an additional special cover, the wiring and the energy beam supply path, for example, of the first transfer mechanism 120 and the additive manufacturing mechanism 110 from being contaminated and damaged, and therefore can avoid malfunction and operation failure events as much as possible.

In addition, in the composite machining machine 10, the first transfer mechanism 120 of the additive manufacturing mechanism 110 and the second transfer mechanism 140 of the cutting mechanism 130 have been configured as independent components. This configuration allows composite machining of additive manufacturing and cutting to be performed in a substantially single machining region, without causing a restriction to arise in each of machining regions in a relation between the additive manufacturing mechanism 110 and the cutting mechanism 130.

In particular, the first transfer mechanism 120 and the second transfer mechanism 140 are in a longitudinal relation in a height direction (X direction), leading to a reduced footprint of the whole composite machining machine 10. In addition, the second region SA can be reduced to minimum, for which a cover structure is required with higher durability against scattering chips, for example, and higher sealing performance in order to prevent cutting oil, for example, from leaking externally, achieving cost reduction.

In addition, the second transfer mechanism 140 that causes the cutting mechanism 130 to move is slidably disposed on the base 101, separately from the additive manufacturing mechanism 110, and therefore the cutting mechanism 130 can be rigid enough to accept a counterforce from a workpiece W during cutting.

Further, in the composite machining machine 10, the first machining head 111 of the additive manufacturing mechanism 110 is disposed at the retraction position EP during a cutting step while being partitioned from the second region SA. In this state, machining hours can be shortened by adjusting the first machining head 111 and performing arrangement steps including part replacements, for example, during the cutting.

Figure 6:
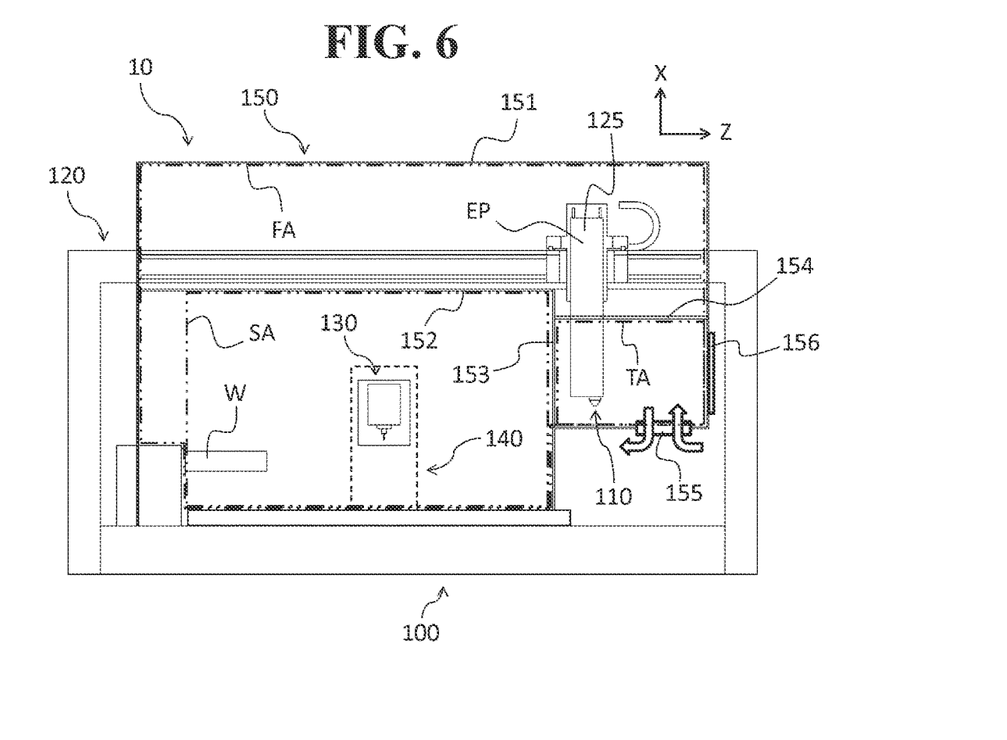
FIG. 6 is a partial cross-sectional view of a composite machining machine according to the first modification of the example of the present invention, the partial cross-sectional view schematically illustrating the composite machining machine.

Next, composite machining machines according to modifications of the example of the present invention will now be described with reference to FIGS. 6 to 8. FIG. 6 is a partial cross-sectional view of a composite machining machine according to the first modification of the example of the present invention, the partial cross-sectional view schematically illustrating the composite machining machine.

As illustrated in FIG. 6, a composite machining machine 10 according to the first modification includes a third region definition member 154 that is openable, and that defines and separates from outside, in a first region FA inside a main cover 151, a third region (arrangement region) TA including a retraction position EP to which a first machining head 111 of an additive manufacturing mechanism 110 retracts.

In addition, a second region definition member 153 is disposed between the first machining head 111 and a second machining head 131, i.e., adjacent to a boundary between the second region and the third region, described above, when the first machining head 111 is caused to move to the retraction position EP.

The third region definition member 154 has a cutout portion (not shown) into which an X-axis arm 125 of a first transfer mechanism 120 will be inserted. However, another configuration of the third region definition member 154 is similar to a configuration of a first region definition member 152, and the third region definition member 154 turns between a closed position and an open position to perform open/close operations based on an instruction given by a control mechanism.

In addition, on a main cover 151 inside which the third region TA lies includes a dust collection mechanism 155 and an open/close door 156. The dust collection mechanism 155 collects dust from an atmosphere in the third region TA. The open/close door 156 is used by an operator to access inside from outside.

With the composite machining machine 10 according to the first modification, during a cutting step, while the additive manufacturing mechanism 110 is positioned at the retraction position EP, the third region definition member 154 is closed to define the third region TA, and dust present inside is collected by the dust collection mechanism 155.

Components such as a nozzle and an optical system can therefore be less likely to be adhered with dust, for example, during an arrangement step such as adjustment of the first machining head 111 by an operator.

Figure 7:
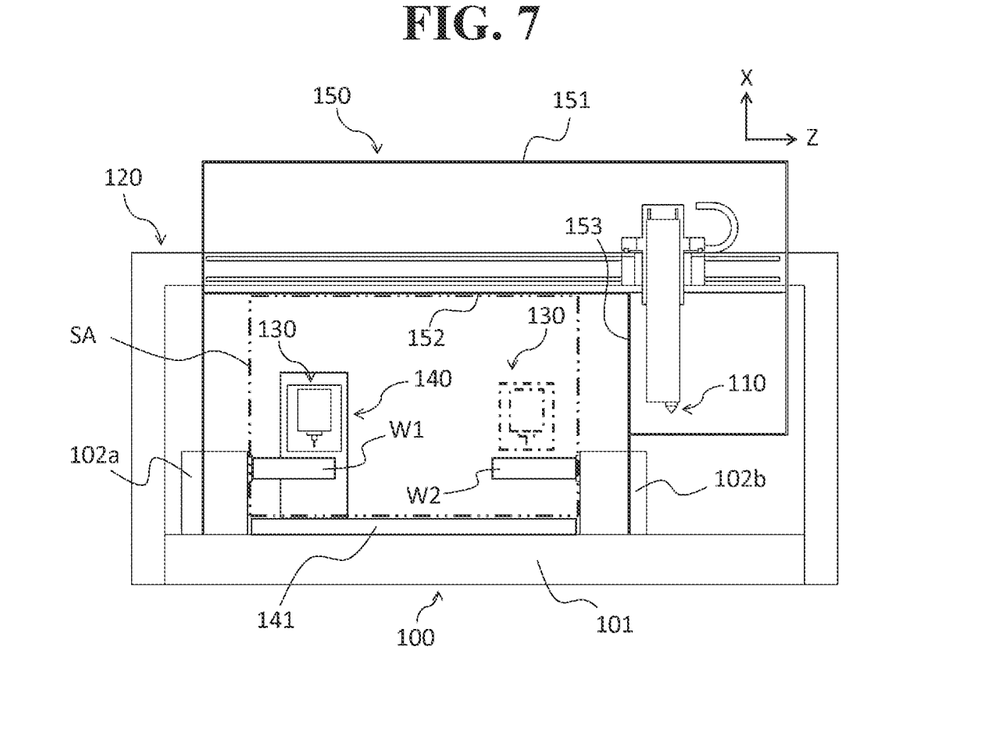
FIG. 7 is a partial cross-sectional view of a composite machining machine according to the second modification of the example of the present invention, the partial cross-sectional view schematically illustrating the composite machining machine.

FIG. 7 is a partial cross-sectional view of a composite machining machine according to the second modification of the example of the present invention, the partial cross-sectional view schematically illustrating the composite machining machine.

As illustrated in FIG. 7, a composite machining machine 10 according to the second modification includes, in a second region SA inside a main cover 151, a first holding mechanism 102a and a second holding mechanism 102b that respectively hold a first workpiece W1 and a second workpiece W2.

The first holding mechanism 102a and the second holding mechanism 102b respectively have a configuration similar to the configuration of the holding mechanism 102 illustrated in FIG. 2, and are disposed on a base 101 at positions in the second region SA so that the first workpiece W1 and the second workpiece W2 face each other.

In addition, between the first holding mechanism 102a and the second holding mechanism 102b, a cutting mechanism 130 and a second transfer mechanism 140 are disposed. The cutting mechanism 130 moves back and forth in a Z-axis direction between the two holding mechanisms.

With the composite machining machine 10 according to the second modification, which has a configuration allowing relocating, between the two facing workpieces W1 and W2, positions of a first machining head 111 of an additive manufacturing mechanism 110 and a second machining head 131 of the cutting mechanism 130 to other respective positions in X-axis, Y-axis, and Z-axis directions, the additive manufacturing mechanism 110 and the cutting mechanism 130 can move back and forth to perform additive manufacturing and cutting on respective workpieces, allowing a plurality of workpieces to be machined by arranging the workpieces only once for increased productivity.

In addition, disposing the two holding mechanisms so as to face each other does not require an increased second region SA for cutting, which makes it possible to effectively utilize a space of the whole composite machining machine.

In addition, in the second modification illustrated in FIG. 7, a second cutting mechanism (not shown) that corresponds to the second holding mechanism 102b may be disposed.

With the above-described configuration, cutting can simultaneously be performed on a plurality of workpieces, reducing cutting hours for the plurality of workpieces.

In addition, in the second modification illustrated in FIG. 7, a mechanism configured to pass a workpiece between the first holding mechanism 102a and the second holding mechanism 102b may be disposed.

With the above-described configuration, an arrangement step can be omitted when different kinds of cutting or additive manufacturing are performed at the first holding mechanism 102a and the second holding mechanism 102b.

The second modification illustrated in FIG. 7 may further be configured to be disposed with an additional partition (not shown) between the first holding mechanism 102a and the second holding mechanism 102b.

With the above-described configuration, while cutting is performed on a workpiece attached to one of the holding mechanisms, additive manufacturing can be performed on another workpiece attached to the other one of the holding mechanisms, shortening machining hours.

Figure 8:
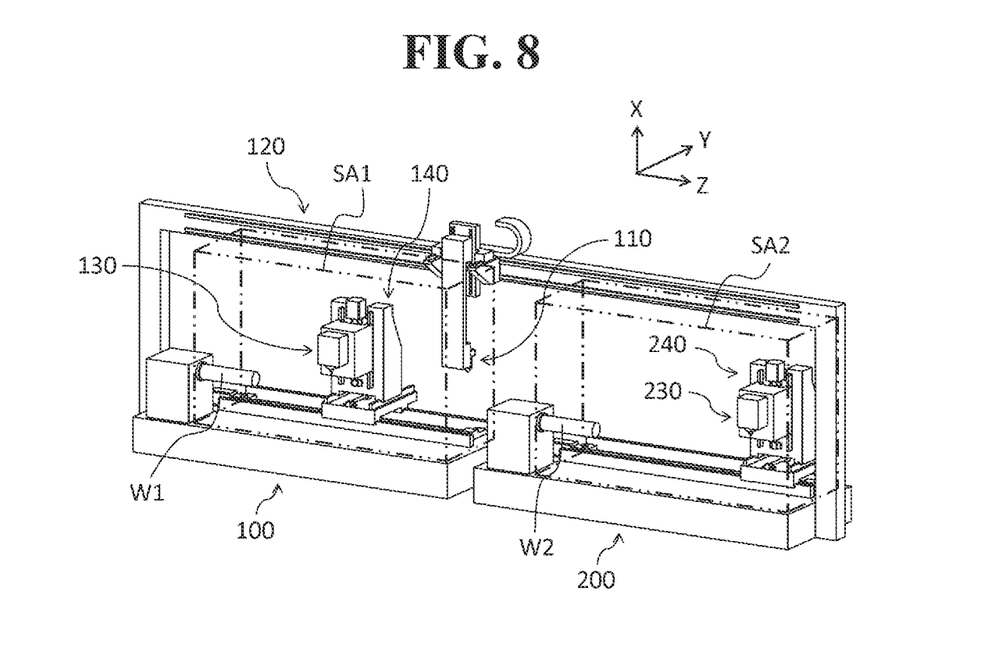
FIG. 8 is a perspective view of an additive manufacturing mechanism and a cutting mechanism applied to a composite machining machine according to the third modification of the example of the present invention, the perspective view illustrating how the additive manufacturing mechanism and the cutting mechanism are arranged.

FIG. 8 is a perspective view of an additive manufacturing mechanism and a cutting mechanism applied to a composite machining machine according to the third modification of the example of the present invention, the perspective view illustrating how the additive manufacturing mechanism and the cutting mechanism are arranged.

As illustrated in FIG. 8, a composite machining machine 10 according to the third modification includes, in an area in which a first transfer mechanism 120 causes an additive manufacturing mechanism 110 to be movable, a first body 100 and a second body 200. The first body 100 has a first cutting mechanism 130 and its transfer mechanism 140. The second body 200 has a second cutting mechanism 230 and its transfer mechanism 240.

In the first body 100 and the second body 200, the transfer mechanisms 140 and 240 that cause the respective cutting mechanisms to move respectively have a configuration similar to the configuration of the second transfer mechanism 140 illustrated in FIG. 2. In the respective bodies, two second regions SA1 and SA2 are defined.

In an aspect where the second regions SA1 and SA2 of the two bodies 100 and 200 are enclosed, openable region definition members (not shown) are respectively disposed.

In addition, the additive manufacturing mechanism 110 is configured to move back and forth by the first transfer mechanism 120 between the first body 100 and the second body 200 in a Z-axis direction.

With the composite machining machine 10 according to the third modification, the two parallel bodies 100 and 200 are respectively disposed with cutting mechanisms 130 and 230 that perform cutting, and the region definition members that enclose the respective second regions SA1 and SA2 are disposed. Cutting can therefore be performed on one of the bodies while an additive manufacturing step is performed on the other one of the bodies, increasing productivity.

In addition, the two bodies 100 and 200 respectively and separately include the region definition members, preventing the additive manufacturing mechanism 110 from being contaminated and damaged.

Further, the single additive manufacturing mechanism is configured with respect to the two cutting mechanisms. This configuration eliminates a necessity of disposing a plurality of generally expensive machining machines configured to perform laser machining, for example, and accordingly increases productivity, but reduces a cost of machines to be disposed.

The present invention will not be limited to the configurations of the above-described embodiments, and various modifications are possible.

For example, the above-described composite machining machines have exemplified the cases in which a composite lathe is applied as a cutting mechanism. However, other configurations may be possible, in which another cutting machine, such as a turret lathe and a machining center, is applied as a cutting mechanism.

In addition, the above-described composite machining machines have exemplified the cases in which an additive material or an energy beam to be transferred to a first machining head of an additive manufacturing mechanism is transferred from outside a composite machining machine, using a transmission mechanism. However, a configuration may be applied, in which, depending on a size of a machine, a supply source of an additive material and an emission source of an energy beam are disposed on a first transfer mechanism.

In addition, the above-described composite machining machines may be configured to be additionally disposed with an automatic tool changer (ATC) capable of automatically replacing a part of a first machining head of an additive manufacturing mechanism and a cutting tool or a tool attachment of a cutting mechanism.

Further, the above-described composite machining machines may be configured to be additionally attached with a workpiece conveyance device to a beam member of a portal structure in a first transfer mechanism, and disposed with a workpiece pedestal configured to stock workpieces.

Obviously, numerous modifications and variations of the present invention are possible in light of the above teachings. It is therefore to be understood that within the scope of the appended claims, the present invention may be practiced otherwise than as specifically described herein.

What is claimed is:

1. A composite machining machine configured to perform additive manufacturing and cutting on a workpiece, the composite machining machine comprising:

a first machining head movable relative to the workpiece in a first region to perform additive manufacturing on the workpiece in a second region included in the first region;

a second machining head movable relative to the workpiece in the second region to perform cutting on the workpiece;

a workpiece holder configured to hold the workpiece in the second region;

a cover covering the first region; and a frame of a portal structure comprising:
two columns; and
a beam member coupling the two columns, wherein the cover comprises a region definition member that is openable at least partially, wherein the region definition member is disposed at a position defining the second region in the first region, wherein the first machining head is attached to the beam member so as to move in a guided manner in a predetermined range between the two columns in the beam member, and wherein the beam member is disposed outside and above the second region so that the predetermined range lies inside the first region, and outside and above the second region.

2. The composite machining machine according to claim 1, wherein the first machining head comprises a supply unit configured to supply an additive material to the workpiece, and an irradiation unit configured to irradiate an energy beam onto the workpiece.

3. The composite machining machine according to claim 2, wherein the first machining head comprising the supply unit and the irradiation unit turns about an axis to tilt.

4. The composite machining machine according to claim 1, wherein the second machining head is attached to a transfer mechanism configured to slide on a base of the composite machining machine.

5. The composite machining machine according to claim 1, further comprising an additional workpiece holder to hold an additional workpiece in the second region.

6. The composite machining machine according to claim 5, further comprising an additional second machining head to perform cutting on the additional workpiece, wherein the first machining head is configured to perform the additive manufacturing on the workpiece and the additional workpiece separately.

7. The composite machining machine according to claim 1, wherein the cover further comprises, inside the first region, and outside the second region, an openable third region definition member defining a third region into which the first machining head retracts.

8. The composite machining machine according to claim 7,
wherein the third region is a closed space defined partially inside the cover, and
wherein the cover further comprises a dust collection mechanism configured to collect dust in the closed space.

9. A composite machining machine comprising:
a workpiece holder to hold a workpiece in a second region;
a guide rail provided outside and above the second region;
a first machining head supported on the guide rail to be movable along the guide rail in a first region including the second region and a region outside and above the second region, the first machining head being configured to perform additive manufacturing on the workpiece in the second region;
a second machining head movable relatively to the workpiece in the second region to perform cutting on the workpiece;
a cover to cover the workpiece holder, the guide rail, the first machining head, and the second machining head; and
a partition provided in the cover to take alternatively a first position or a second position, the first machining head being movable to the workpiece along the guide rail to perform additive manufacturing on the workpiece if the partition is in the first position, the partition being configured to isolate the guide rail from the second machining head so that the second machining head performs cutting on the workpiece if the partition is in the second position.

10. The composite machining machine according to claim 9, wherein the partition is configured to isolate the first machining head from the second machining head so that the second machining head performs cutting on the workpiece if the partition is in the second position.

11. The composite machining machine according to claim 10, wherein the partition includes a first partition and a second partition to isolate the guide rail and the first machining head from the second machining head, respectively.

12. The composite machining machine according to claim 9, wherein the partition includes a first partition to isolate the guide rail from the second machining head.

13. The composite machining machine according to claim 9, further comprising:
a frame comprising:
two columns; and
a beam coupling the two columns to define a portal structure, the beam including the guide rail.

* * * * *